(12) United States Patent
Sasaki

(10) Patent No.: US 7,058,431 B2
(45) Date of Patent: Jun. 6, 2006

(54) END-TO-END DELAY CONTROL METHOD FOR BOTH SUPPRESSING END-TO-END DELAY TIME TO A STANDARD VALUE OR LESS AND OPTIMIZING POWER-SAVE OPERATIONS

(75) Inventor: Katsuhiro Sasaki, Minato-Ku (JP)

(73) Assignee: NEC Corporation (JP)

( * ) Notice: Subject to any disclaimer, the term of this patent is extended or adjusted under 35 U.S.C. 154(b) by 227 days.

(21) Appl. No.: 10/671,405

(22) Filed: Sep. 24, 2003

(65) Prior Publication Data

US 2004/0063454 A1 Apr. 1, 2004

(30) Foreign Application Priority Data

Oct. 1, 2002 (JP) ............................. 2002-288675

(51) Int. Cl.
*H04M 1/00* (2006.01)
*H04B 1/38* (2006.01)

(52) U.S. Cl. ...................... 455/574; 455/405; 455/414; 455/456.1; 455/453; 370/318; 370/392; 370/412; 370/320

(58) Field of Classification Search ................ 455/574, 455/456.1, 453, 405, 414; 370/318, 392, 370/412, 320
See application file for complete search history.

(56) References Cited

U.S. PATENT DOCUMENTS 6,636,744 B1 * 10/2003 Da ........................... 455/456.1
6,807,159 B1 * 10/2004 Shorey et al. .............. 370/318

2003/0039222 A1 * 2/2003 Bae et al. ................... 370/320
2003/0086425 A1 * 5/2003 Bearden et al. ............. 370/392
2004/0057446 A1 * 3/2004 Varsa et al. ................. 370/412

FOREIGN PATENT DOCUMENTS

| JP | 2001-313630 | 11/2001 |
| JP | 2001-524268 | 11/2001 |
| JP | 2002-135330 | 5/2002 |
| JP | 2002-185475 | 6/2002 |
| JP | 2002-204278 | 7/2002 |
| JP | 2002204278 A * | 7/2002 |

OTHER PUBLICATIONS

English translation of Japanese application publication No. 2002-204278 dated Jul. 19, 2002.
English translation of Japanese application publication No. 2001-313630 dated Nov. 9, 2001.

(Continued)

*Primary Examiner*—William Trost
*Assistant Examiner*—Chuck Huynh
(74) *Attorney, Agent, or Firm*—Ostrolenk, Faber, Gerb & Soffen, LLP

(57) ABSTRACT

An end-to-end delay acquisition unit in a radio terminal measures end-to-end delay time, which is the delay time required for end-to-end transmission and reception, by using PING packets in an IP network or the time stamp function of RTCP during VoIP communication. An activation period modification determination module that is provided in the radio terminal modifies the activation period of the radio communication module that carries out radio communication such that the end-to-end delay time that has been measured by the end-to-end delay acquisition unit is equal to or less than a standard value that has been stipulated in advance.

10 Claims, 6 Drawing Sheets

OTHER PUBLICATIONS

English translation of Japanese application publication No. 2002-135330 dated May 10, 2002.

English translation of Japanese application publication No. 2002-185475 dated Jun. 28, 2002.

* cited by examiner

|  | R value | end-to-end delay | loss probability |
|---|---|---|---|
| class A | >80 | <100ms | <=0.15 |
| class B | >70 | <150ms | <=0.15 |
| class C | >50 | <400ms | <=0.15 |

END-TO-END DELAY CONTROL METHOD FOR BOTH SUPPRESSING END-TO-END DELAY TIME TO A STANDARD VALUE OR LESS AND OPTIMIZING POWER-SAVE OPERATIONS

BACKGROUND OF THE INVENTION

1. Field of the Invention

The present invention relates to a radio terminal that realizes power-save operations by intermittently activating a radio communication module for realizing radio communication with a radio base station; and more particularly to an end-to-end delay control method for suppressing the end-to-end delay time, which is the delay time required for end-to-end (inter-terminal) transmission and reception, to a stipulated standard value or less.

2. Description of the Related Art

In the radio packet communication mode that is stipulated in, for example, IEEE802.11, a power-save mode is established in which a receiver is periodically activated (awakened) and packets are transmitted and received. An outline of the operation of the power-save mode in IEEE802.11 is next briefly described with reference to FIG. 1.

A radio base station broadcasts beacon packets to all radio terminals at a fixed period, and all radio terminals that are associated with the radio base stations can receive these beacon packets.

A radio terminal that wishes to reduce power consumption shifts to a power-save mode in which the radio terminal is activated to transmit and receive radio waves only when a radio base station transmits the beacon and at other times shifts to a sleep state in which power is not supplied to the radio communication module and radio waves are not transmitted or received. Radio terminals that are in the sleep state are not able to transmit or receive packets, and the radio base station therefore determines which radio terminals are effecting power-save operations and stores packets that are addressed to these radio terminals that are in the power-save mode. The radio base station then uses the periodically transmitted beacon packets to report to each radio terminal which radio terminals currently have packets that are stored for them.

A radio terminal that receives notification of the arrival of packets by means of a beacon packet from the radio base station immediately responds to this notification of arrival and notifies the radio base station that it can now receive the packets. The radio base station, having received this response from the radio terminal, immediately transfers the packets that have been saved.

Even though active only when beacon packets are transmitted, a radio terminal that realizes power-save operations in this way is able to receive packets for data without any losses. In the following explanation, the time interval over which power is supplied and cut off to the radio communication module is referred to as the "activation period".

In addition, a radio terminal that is effecting power-save operations can skip activation (supply of power) in any beacon period. In FIG. 1, radio terminal A is activated in each period, but radio terminal B is activated in every other period, whereby power consumption can be even more greatly limited than when activating with each period.

The disadvantage of the power-save mode operation is the delay in the transfer of packets. In other words, packets are stored in a radio base station during the interval from the arrival of the packets in the radio base station to the arrival of the activation period of the radio terminal to which these packets are addressed, and this operation therefore produces a maximum delay that is equal to the activation period of the destination radio terminal. In other words, the greater the power-save effect that a radio terminal obtains, the greater the delay time or jitter (fluctuation in delay time) in the radio space.

A service provider that offers voice service using, for example, VoIP (Voice-over Internet Protocol) on an IP network must meet speech quality standards that have been set by the Ministry of Public Management, Home Affairs, Posts and Telecommunications. Classes A–C are currently set as three levels of standards for rating the quality of VoIP, and the standard values shown in FIG. 2 must be met for comprehensive transmission quality rate (R value), end-to-end delay, and loss probability. In other words, the end-to-end delay time is stipulated to be less than 100 ms for Class A, less than 150 ms for Class B, and less than 400 ms for Class C. In this case, the end-to-end delay time is the delay time required for transmission and reception from end to end (between terminals).

However, a radio terminal that is operating in a power-save mode such as the mode described in the foregoing explanation cuts power consumption by means of periodic activation, and when attempting a conversation by VoIP in the power-save mode, the added delay in the radio space may exceed the stipulated quality limits.

On the other hand, preventing the power-save operation in the radio terminal, while minimizing the delay time in the radio space, may prevent the radio terminal from obtaining a practical conversation time, particularly when the radio terminal is a battery-driven mobile terminal.

As end-to-end delay control methods of the prior art for limiting end-to-end delay to less than a standard value, Japanese Patent Laid-Open Publication No. 2002-204278 and Japanese Patent Laid-Open Publication No. 2002-135330 disclose methods in which the delay time is measured in a transmission path in a data transmission system and the bit rate and communication bandwidth settings are modified when these values do not satisfy the standard value. However, in either case of the prior art, there is no radio space in the transmission path, and the use of these examples of the prior art therefore does not enable a limitation of the radio space delay that is caused by the power-save operations in radio terminals as described in the foregoing explanation.

SUMMARY OF THE INVENTION

It is an object of the present invention to provide both a radio terminal and an end-to-end delay control method that allow optimum power-save operations to be carried out within a range that allows limitation of the end-to-end delay time to the stipulated standard value or less.

To achieve the above-described object, the radio terminal of the present invention includes:

means for realizing power-save operations by intermittently activating a radio communication module for realizing radio communication with a radio base station;

end-to-end delay acquisition means for measuring the end-to-end delay time, which is the delay time required for end-to-end transmission and reception; and activation period modification determination means for modifying the activation period of the radio communication module such that the end-to-end delay time that has been measured by the end-to-end delay time acquisition means is equal to or less than a standard value that has been stipulated in advance.

According to the present invention, the activation period of the radio communication module is modified such that the end-to-end delay time that has been measured by the end-to-end delay time acquisition means is limited to the stipulated standard value or less, and as a result, optimum power-save operations can be realized within the range that allows the end-to-end delay time to be suppressed to the stipulated standard value or less.

In addition, to achieve the above-described object, the radio terminal of the present invention includes:

means for realizing power-save operations by intermittently activating a radio communication module for realizing radio communication with a radio base station;

end-to-end delay acquisition means for measuring the end-to-end delay time, which is the delay time required for end-to-end transmission and reception;

activation period notification packet transceiving means for both transmitting an activation period notification packet for reporting its own activation period to the terminal of a communication partner and receiving activation period notification packets from the terminal of a communication partner; and activation period modification determination means for directing the activation period notification packet transceiving means to transmit an activation period notification packet to the terminal of a communication partner when the end-to-end delay time that has been measured by the end-to-end delay acquisition means is equal to or greater than the standard value that has been set in advance, comparing the activation period that is reported from the terminal of the communication partner by means of an activation period notification packet with its own activation period, and performing a modification to shorten its own activation period when its own activation period is equal to or greater than the activation period of the terminal of the communication partner.

According to the present invention, the end-to-end delay acquisition means uses RTCP packets during communication to monitor whether or not the end-to-end delay time meets the stipulated standard at fixed time intervals, and when the end-to-end delay time does not meet the stipulated standard, the activation period modification determination means modifies the activation period dynamically (in real time). As a result, the end-to-end delay time can be limited to a particular fixed value or less while maintaining an optimum power-save state even when connecting to a communication partner having different network environments or when the delay time of the network varies during communication, and the quality of a voice conversation can therefore be guaranteed without entailing a great loss of battery drive time.

In addition, the terminal having the greater activation period performs an operation for shortening its own activation period, whereby unbalanced power-save operations in which only one of the terminals shortens its activation period is prevented.

In another radio terminal of the present invention, the end-to-end delay acquisition means may measure the end-to-end delay time based on the time for a packet to make a round-trip to and from the terminal of the communication partner. In addition, PING packets or RTCP packets may be used as the packets.

A radio terminal of the present invention for achieving the above-described object includes:

a means for performing power-save operations by intermittently activating a radio communication module for realizing radio communication with a radio base station;

a network delay time database for storing, for each fixed terminal that can be connected without the interposition of radio space, the network delay time from the radio base station to the fixed terminal; and activation period modification determination means for acquiring the network delay time from the radio base station to the fixed terminal of the communication partner from the network delay time database before beginning communication with the fixed terminal, calculating the end-to-end delay time, which is the time required for end-to-end transmission and reception, by adding the network delay time and the radio space delay time as far as radio base station, and modifying the activation period of the radio communication module such that the end-to-end delay time is limited to the stipulated standard value or less.

According to the present invention, a radio terminal is provided with a network delay time database that stores network delay times of fixed terminals that are to be communication partners, and the activation period modification determination means can therefore calculate the end-to-end delay time when connected to the fixed terminal of a communication partner before beginning communication. This activation period modification determination means then performs power-save operations of the radio communication module in an activation period such that the end-to-end delay time is limited to a stipulated standard value or less. As a result, with each change of partner that is connected for communication, the optimum activation period can be selected according to the network delay time of the fixed terminal that is connected within a range that allows suppression of the end-to-end delay time to the stipulated standard value or less.

The above and other objects, features, and advantages of the present invention will become apparent from the following description with reference to the accompanying drawings, which illustrate examples of the present invention.

DETAILED DESCRIPTION OF THE PREFERRED EMBODIMENTS

First Embodiment

Figure 3:
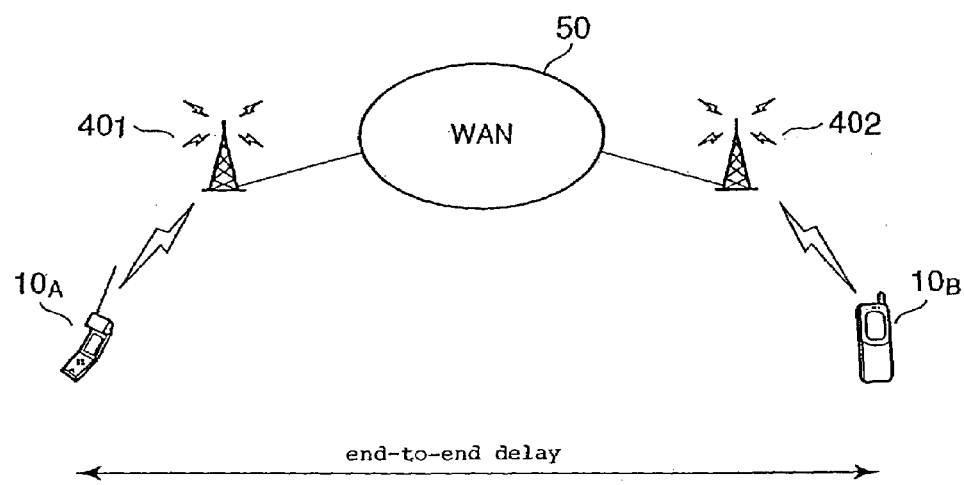
FIG. 3 is a system diagram showing the configuration of a radio communication system that includes the radio terminal of the first embodiment of the present invention.

FIG. 3 is a system diagram showing the configuration of a radio communication system that is provided with the radio terminal of the first embodiment of the present invention.

The radio communication system in this embodiment is made up from radio terminals $10_A$ and $10_B$, and radio base stations 401 and 402; radio base stations 401 and 402 being connected by means of WAN (Wide Area Network) 50.

Figure 4:
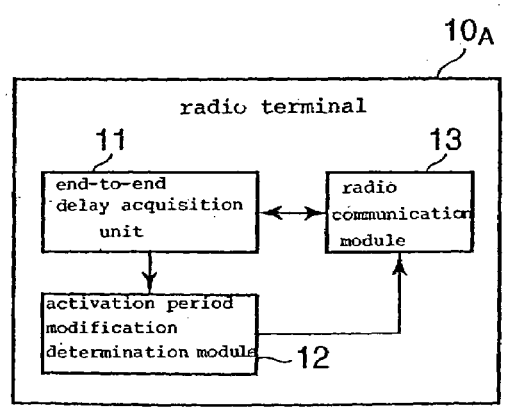
FIG. 4 is a block diagram showing the construction of radio terminal $10_A$ of the first embodiment of the present invention.

As shown in FIG. 4, radio terminal $10_A$ is provided with: end-to-end delay acquisition unit 11, activation period modification determination module 12, and radio communication module 13. The construction of radio terminal $10_B$ is the same as that of radio terminal $10_A$ and redundant explanation of this terminal is therefore omitted.

Radio communication module 13 is a module that is provided with transmitting and receiving capabilities for performing radio communication with radio base stations 401 and 402.

End-to-end delay acquisition unit 11 measures the delay time necessary for transmitting and receiving end-to-end (hereinbelow referred to as "end-to-end delay time"), i.e., the time for data that have been transmitted from radio terminal $10_A$ to reach radio terminal $10_B$.

Methods by which end-to-end delay acquisition unit 11 measures the round-trip time of packets during communication include methods that take advantage of PING packets in an IP network or the time stamp functions of RTCP (RTP Control Protocol) during VoIP communication.

PING packets are one type of ICMP (Internet Control Message Protocol), and devices that incorporate IP protocol are necessarily provided with the capability to transmit and receive ICMP. A device that has received PING packets immediately transmits the same packets to the transmission source, and the use of this configuration therefore enables the measurement of the round-trip time of the network.

RTCP (RTP control protocol) packets are control packets that are exchanged in VoIP communication, and the time at which the packet transmitter finally receives the packet and the time difference from this reception time until the transmission of the RTCP packet are recorded in the packet. The recipient of an RTCP packet is able to calculate the network round-trip time at the time of receiving the RTCP packet by recording the time of transmitting the RTCP packet.

End-to-end delay acquisition unit 11 can measure the end-to-end delay time by taking half of the network round-trip time that is obtained as described hereinabove.

Activation period modification determination module 12 controls the activation of radio communication module 13 and modifies the activation period of radio communication module 13 such that the end-to-end delay time that is measured by end-to-end delay acquisition unit 11 is equal to or less than a standard value that has been stipulated in advance. In this case, the activation period is the time interval for repetition of the supply of power and cut-off of power to radio communication module 13.

Details regarding the operation of the radio terminal of this embodiment are next described with reference to the accompanying figures.

In the network that is constructed as shown in FIG. 3, radio terminals $10_A$ and $10_B$ perform voice conversation by packet communication. Terminal $10_A$ performs power-save operations such as the operations described in IEEE 802.11 to limit power consumption. In other words, power is supplied to the radio communication module intermittently for transmission and reception of packets. At this time, radio terminal $10_A$ (or both radio terminals $10_A$ and $10_B$) measure the end-to-end delay time by means of end-to-end delay acquisition unit 11. Activation period modification determination module 12 determines whether the result of this measurement satisfies the stipulated standard value, and if the standard value is not satisfied, modifies the activation period of radio communication module 13 such that the end-to-end delay time is limited to a particular fixed value or less.

According to radio terminals $10_A$ and $10_B$ of the present embodiment, modification of the activation period of radio communication module 13 such that the measured end-to-end delay time is brought to the stipulated standard value or less allows optimum power-save operations to be realized within a range that allows the end-to-end delay time to be limited to a stipulated standard value or less.

Second Embodiment

Figure 5:
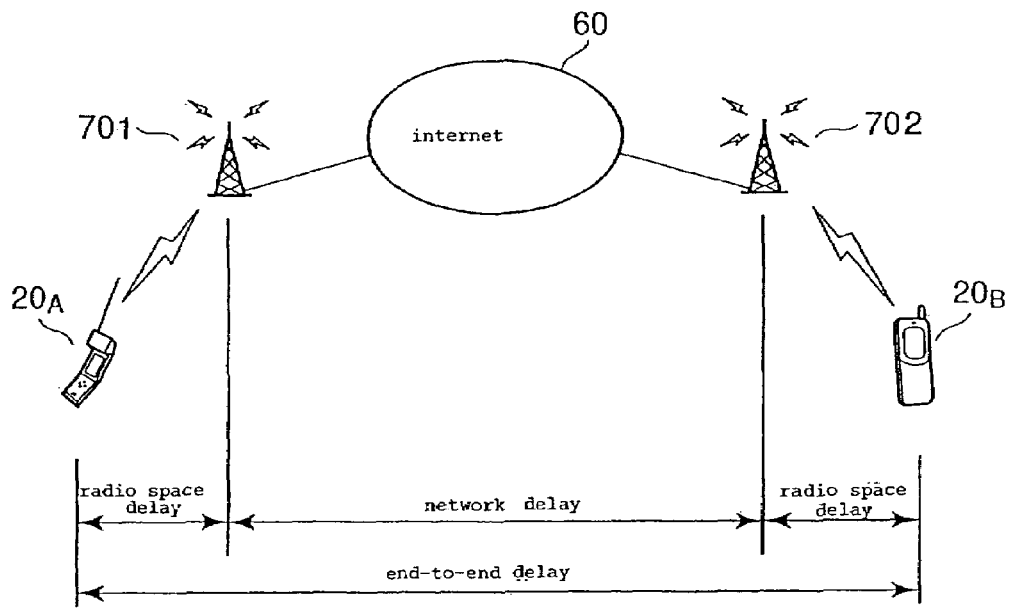
FIG. 5 is a system diagram showing the configuration of the radio communication system that includes the radio terminal of the second embodiment of the present invention.

Explanation next regards the radio terminal of the second embodiment of the present invention. In the above-described first embodiment, the present invention was applied to a typical radio communication system, but the present embodiment is for a case in which the present invention is applied to a radio communication system that provides VoIP service. FIG. 5 is a system diagram showing the configuration of a radio communication system that is provided with radio terminals according to the second embodiment of the present invention.

In this radio communication system, IEEE 802.11 wireless LAN base stations 701 and 702 are connected to Internet 60 at separate points, as shown in FIG. 5. This radio communication system includes radio VoIP terminals $20_A$ and $20_B$ that can communicate with radio LAN base stations 701 and 702, respectively, and these radio VoIP terminals $20_A$ and $20_B$ operate in a power-save mode that is described in IEEE 802.11. Radio VoIP terminals $20_A$ and $20_B$ that operate in the power-save mode described in IEEE 802.11 cut power consumption by intermittently activating radio communication modules as previously described.

In the present embodiment, the beacon periods of radio LAN base stations 701 and 702 are both 100 ms, while the activation period of radio VoIP terminal $20_A$ is 100 ms and the activation period of radio VoIP terminal $20_B$ is 200 ms. It is further assumed that radio VoIP terminals $20_A$ and $20_B$ must meet the voice quality standards of Class C as stipulated by the Ministry of Public Management, Home Affairs, Posts and Telecommunications in the VoIP shown in FIG. 2. In addition, the network delay time between radio LAN base stations 701 and 702 is assumed to be 150 ms.

Figure 6:
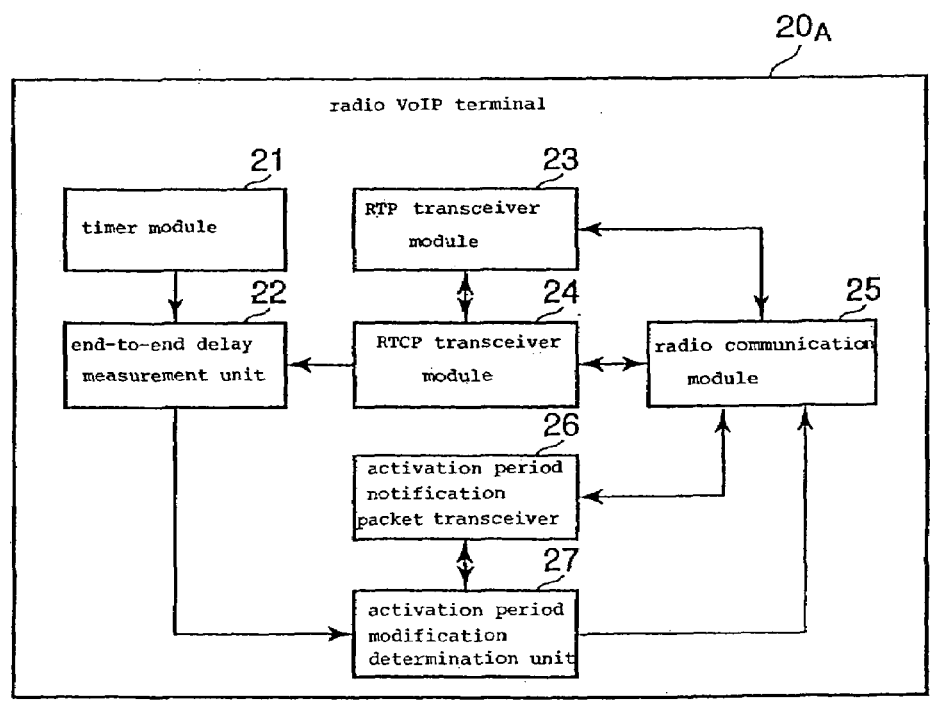
FIG. 6 is a block diagram showing the construction of radio VoIP terminal $20_A$ of the second embodiment of the present invention.

The construction of radio VoIP terminal $20_A$ in the present embodiment is next shown in FIG. 6. In FIG. 6, constituent elements that are identical to constituent elements in FIG. 4 are identified by the same reference numerals, and redundant explanation is here omitted. In addition, the construction of radio VoIP terminal $20_B$ is identical to that of radio VoIP terminal $20_A$, and explanation of this constituent element is therefore also omitted.

As shown in FIG. 6, radio VoIP terminal $20_A$ in the present embodiment is made up from: timer module 21, end-to-end delay measurement unit 22, RTP transceiver module 23, RTCP transceiver module 24, radio communication module 25, activation period notification packet transceiver 26, and activation period modification determination unit 27.

Timer module 21 counts time intervals that have been set. Radio communication module 25 is a module equipped with the capability for performing radio communication with radio base station 701. RTP transceiver module 23 transmits and receives RTP (Real-time Transport Protocol) packets, and RTCP transceiver module 24 transmits and receives RTCP packets.

End-to-end delay measurement unit 22 uses RTCP packets that have been transmitted and received by RTCP transceiver module 24 to measure the end-to-end delay time at fixed time intervals that are counted by timer module 21.

Activation period notification packet transceiver 26 transmits activation period notification packets for reporting the activation period of its own radio terminal to the terminal of a communication partner based on instructions from activation period modification determination unit 27 and receives activation period notification packet from the terminal of the communication partner.

Activation period modification determination unit 27 transmits an activation period notification packet for reporting its current activation period to the terminal of the communication partner by instructing activation period notification packet transceiver 26 if the end-to-end delay time that has been measured by end-to-end delay measurement unit 22 is equal to or greater than the standard value that has been set beforehand, compares its own activation period with the activation period that is reported by means of activation period notification packets from the communication partner, and carries out modification for shortening its own activation period when its own activation period is equal to or greater than the activation period of the terminal of the communication partner.

Timer module 21, end-to-end delay measurement unit 22, RTP transceiver module 23, and RTCP transceiver module 24 in the present embodiment are equivalent to end-to-end delay acquisition unit 11 in radio terminal $10_A$ of the first embodiment as shown in FIG. 4.

Details regarding the operation of the radio terminal of the present embodiment are next explained with reference to the accompanying figures.

Figure 7:
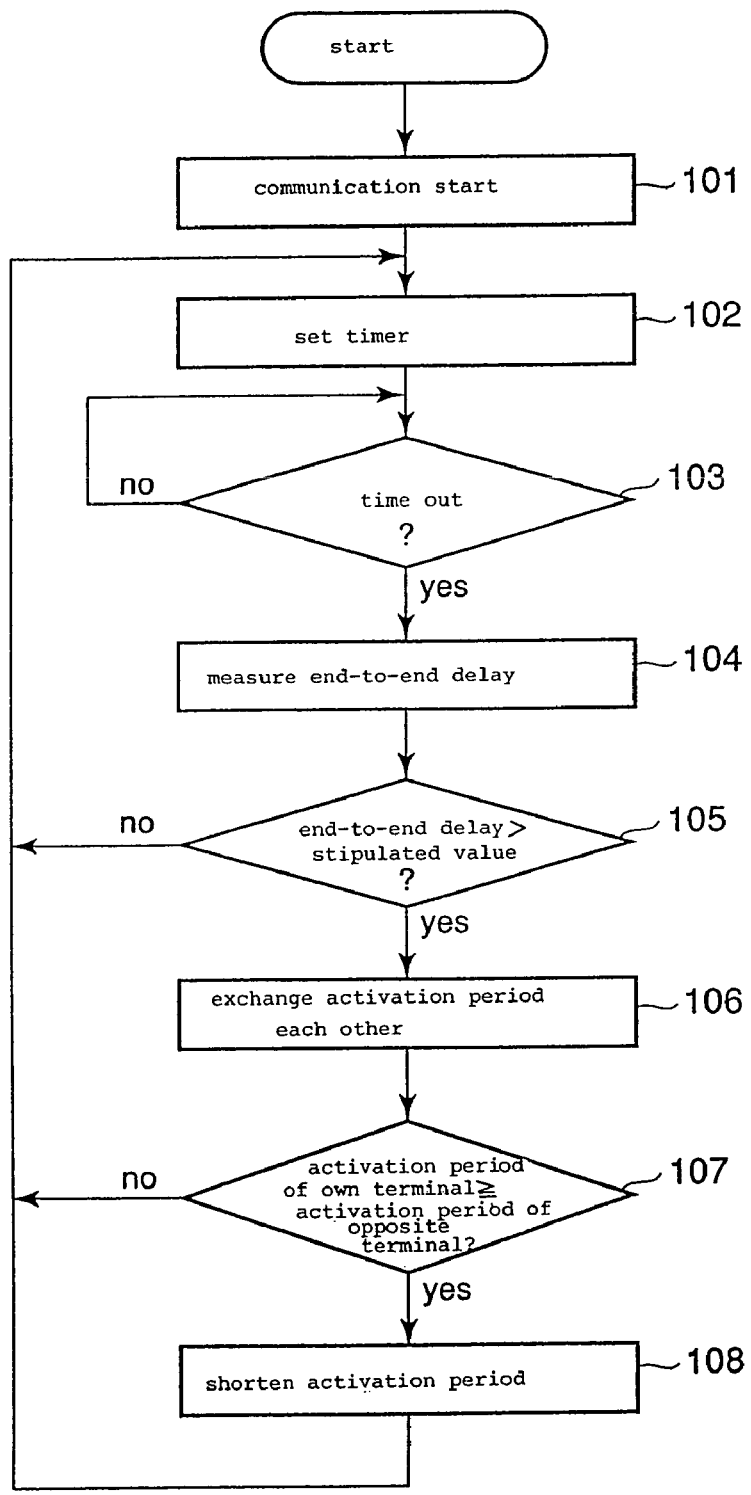
FIG. 7 is a flow chart showing the operation of radio VoIP terminal $20_A$ of the second embodiment of the present invention.

Explanation is here given for a case in which radio VoIP terminal $20_A$ begins transmitting and receiving voice data by VoIP to radio VoIP terminal $20_B$. Under the above-described conditions, the radio space delay in radio VoIP terminal $20_A$ is a maximum of 100 ms and the radio space delay in radio VoIP terminal $20_B$ is a maximum of 200 ms, and the maximum end-to-end delay time is therefore 450 ms, which does not clear the quality conditions for Class C. Explanation is next presented regarding the operation of radio VoIP terminal $20_A$ with reference to the block diagram of FIG. 6 and the flow chart of FIG. 7.

First, upon the start of communication between radio VoIP terminal $20_A$ and radio VoIP terminal $20_B$ in step 101, timer settings in timer module 21 are carried out in radio VoIP terminal $20_A$ in step 102. In step 103, timer module 21 then counts a particular fixed time interval by halting processing until timer module 21 times out.

In step 104, end-to-end delay measurement unit 22 of radio VoIP terminal $20_A$ calculates the end-to-end delay time based on the time-stamp information of the RTCP packets that are received from VoIP terminal $20_B$ at every other fixed time interval that is counted in this way. In step 105, activation period modification determination unit 27 determines whether the end-to-end delay time that has been measured by end-to-end delay measurement unit 22 is equal to or greater than 400 ms, which is the standard for Class C. In this case, the end-to-end delay time is a maximum of 450 ms, and this being greater than the 400 ms standard for Class C, activation period modification determination unit 27 of radio VoIP terminal $20_A$ recognizes the need to shorten the end-to-end delay time between radio VoIP terminals $20_A$ and $20_B$. In step 106, activation period modification determination unit 27 of radio VoIP terminal $20_A$ uses activation period notification packet transceiver unit 26 to transmit an activation period notification packet to radio VoIP terminal $20_B$. The current activation interval of radio VoIP terminal $20_A$, which is 100 ms, is reported to radio VoIP terminal $20_B$ by means of this activation period notification packet. As a response to this notification, radio VoIP terminal $20_B$ reports its own activation interval, which is 200 ms, to radio VoIP terminal $20_A$.

Each of activation period modification determination units 27 of radio VoIP terminals $20_A$ and $20_B$ next compares its own activation period with that of the communication partner in step 107, and if its own activation period is equal to or longer than that of the communication partner, modifies its own activation interval to a shorter value in step 108.

In this case, the activation period of radio VoIP terminal $20_A$ is 100 ms, and the activation period of radio VoIP terminal $20_B$ is 200 ms, and radio VoIP terminal $20_B$, having the longer activation period, therefore modifies its activation period to a shorter value. In other words, activation period modification determination unit 27 of radio VoIP terminal $20_B$ shortens the activation period of radio communication module 25 of radio VoIP terminal $20_B$ from a two-beacon interval to a one-beacon interval. By means of this process, the radio space delay in radio VoIP terminal $20_B$ becomes a maximum of 100 ms, and the end-to-end delay therefore becomes a maximum of 350 ms, which meets the delay requirement of Class C.

As another example, if the above-described network delay time is assumed to be 250 ms, the end-to-end delay time will be 450 ms despite the modification of activation interval from 200 ms to 100 ms by radio VoIP terminal $20_B$, meaning that the requirements of Class C cannot be satisfied. In this case, the operations of radio VoIP terminals $20_A$ and $20_B$ proceed as follows.

When radio VoIP terminals $20_A$ and $20_B$ first exchange activation period notification packets, radio VoIP terminal $20_B$ modifies its activation period to 100 ms. Subsequently, when again measuring the end-to-end delay time by means of the RTCP packets, radio VoIP terminal $20_A$ recognizes that the end-to-end delay time exceeds 400 ms.

Radio VoIP terminals $20_A$ and $20_B$ then exchange activation period notification packets as in the beginning to report the activation intervals. In this case, radio VoIP terminals $20_A$ and $20_B$ both have the same value of 100 ms, and both terminals therefore shorten the radio space delay. At this time, the activation interval is one beacon interval for both terminals, and since this is the minimum interval, both terminals reduce the radio space delay by making the transition from power-save mode to normal mode.

According to the end-to-end delay control method of the present embodiment, periodic monitoring is performed during communication to determine whether the end-to-end delay time meets a stipulated standard, and when the stipulated standard is not being met, the activation period is modified dynamically (in real time). As a result, the end-to-end delay time can be limited to a fixed value or less while maintaining the optimum power-save state despite connection to a communication partner having a different network environment or changes in the network delay time during communication, and the quality of voice conversation can therefore be guaranteed without entailing a large loss in the battery-drive time.

Although a case was described in the present embodiment in which RTCP packets were used to measure the end-to-end delay time, the end-to-end delay control method according to the present embodiment can be similarly applied when using packets other than RTCP packets (for example, PING packets) to measure the end-to-end delay time or when measuring the end-to-end delay time by another method.

Third Embodiment

Explanation next regards the radio terminal of the third embodiment of the present invention. While the terminal of the communication partner was also a radio terminal in the second embodiment described hereinabove, the present embodiment differs in that the communication partner is a fixed terminal that can be connected from a radio base station without interposed radio space.

Figure 8:
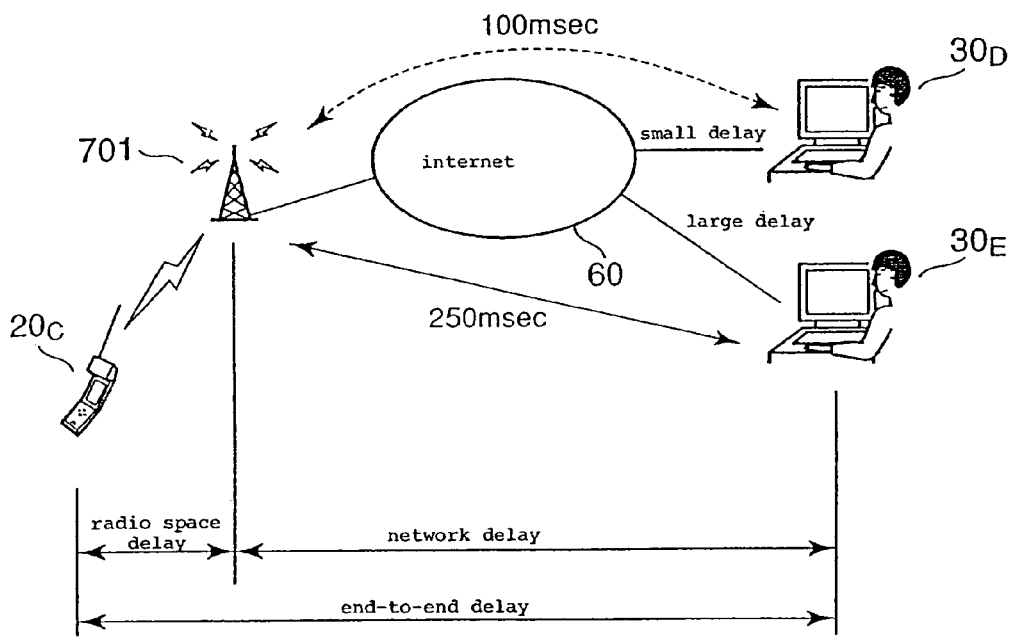
FIG. 8 is a system diagram showing the configuration of the radio communication system that includes the radio terminal of the third embodiment of the present invention.

When the communication partner is a fixed terminal, little change occurs in the end-to-end delay time after the start of communication, but the network delay time changes for each fixed terminal that is connected. Thus, in the radio terminal of the present embodiment, the activation period of the radio communication module is modified such that the end-to-end delay time is limited to the stipulated standard value or less when the communication starts and the end-to-end delay time is not continuously monitored during communication. FIG. 8 is a system diagram showing the configuration of the radio communication system that is equipped with radio terminals of the third embodiment of the present invention. In FIG. 8, constituent elements that are identical to constituent elements in FIG. 5 are identified by the same reference numerals, and redundant explanation is here omitted.

As shown in FIG. 8, this radio communication system includes IEEE 802.11 radio LAN base station 701 that is connected to Internet 60, and radio VoIP terminal $20_C$ that uses this radio LAN base station 701 for communication.

In addition, fixed terminals that can be connected from radio LAN base station 701 without interposed radio space include VoIP terminal $30_D$ that is connected to Internet 60 by a link having a small amount of delay and VoIP terminal $30_E$ that is connected to Internet 60 by a link having a large amount of delay.

The beacon period of radio LAN base station 701 is assumed to be 100 ms, and radio VoIP terminal $20_C$ is assumed to be performing power-save operations with an activation period of 200 ms. In addition, the network delay time from radio LAN base station 701 to VoIP terminal $30_D$ is assumed to be 100 ms, and the network delay time from radio LAN base station 701 to VoIP terminal $30_E$ is assumed to be 250 ms.

The network delays of the paths when radio VoIP terminal $20_C$ communicates with VoIP terminal $30_D$ and VoIP terminal $30_E$ are measured in advance and saved in the internally provided network delay time database.

Figures 1, 2:
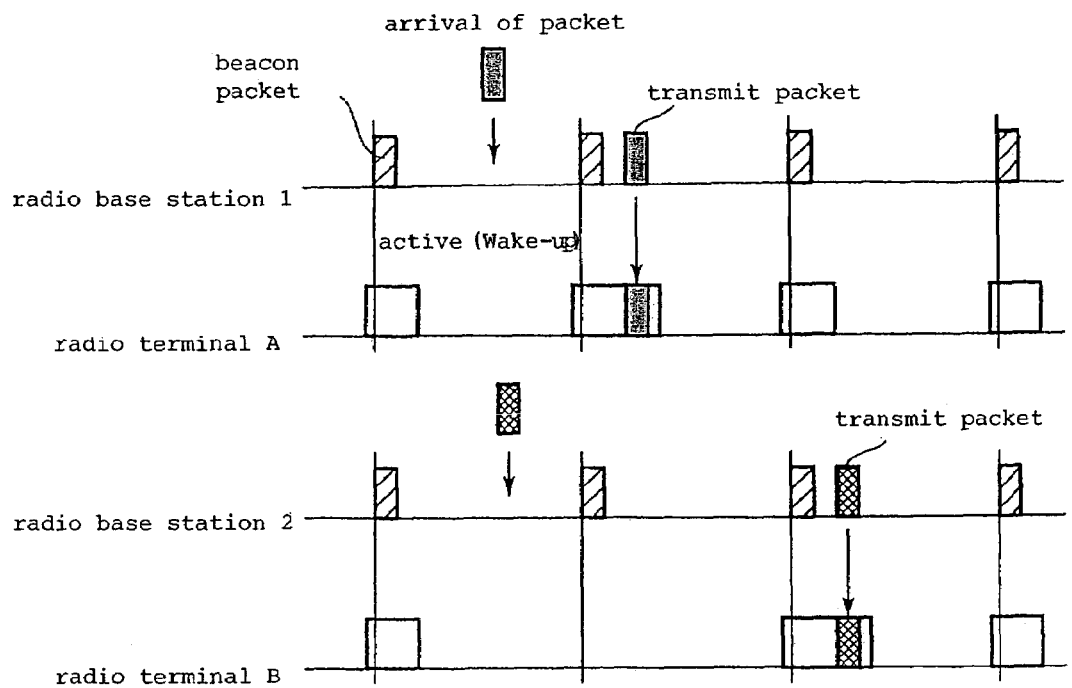
FIG. 1 is a view for explaining operations of a power-save mode.
FIG. 2 shows the quality classes for an IP telephone.

In addition, radio VoIP terminal $20_C$ must satisfy the standards of Class C shown in FIG. 2 as the communication quality of VoIP. In other words, radio VoIP terminal $20_C$ is required to limit the end-to-end delay during VoIP communication to less than 400 ms.

Figure 9:
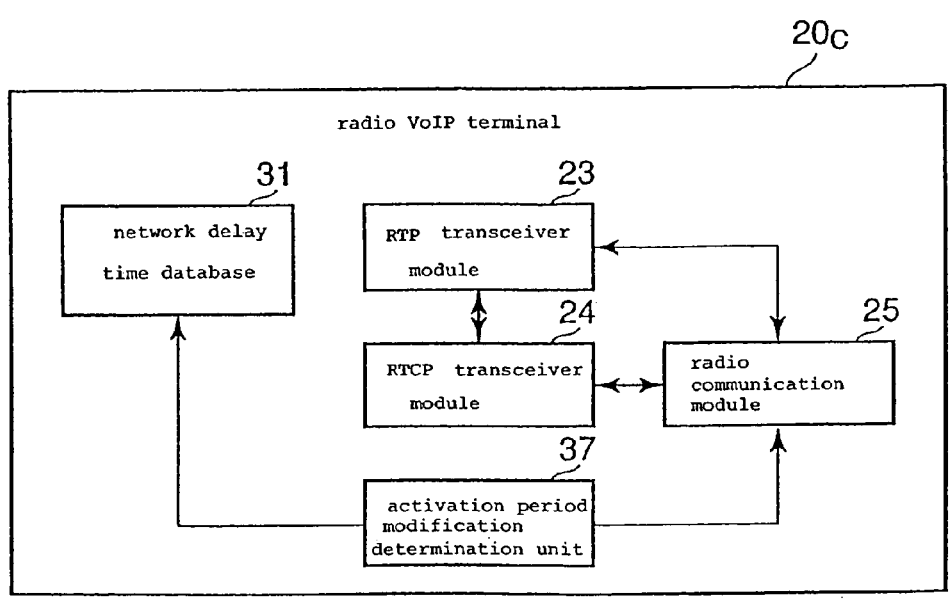
FIG. 9 is a block diagram showing the construction of radio VoIP terminal $20_C$ in the third embodiment of the present invention.

FIG. 9 shows the construction of radio VoIP terminal $20_C$ in the present embodiment. In FIG. 9, constituent elements that are identical to constituent elements in FIG. 6 are identified by the same reference numerals, and redundant explanation is here omitted.

As shown in FIG. 9, radio VoIP terminal $20_C$ in the present embodiment is provided with: RTP transceiver module 23, RTCP transceiver module 24, radio communication module 25, network delay time database 31, and activation period modification determination unit 37.

The network delay times from radio LAN base station 701 to each of VoIP terminals $30_D$ and $30_E$ are stored for each VoIP terminal in network delay time database 31. More specifically, the network delay times from radio LAN base station 701 are stored in network delay time database 31 by address (identifier), network address, or domain name of the VoIP terminal of the communication partner.

Activation period modification determination unit 37 obtains the network delay time of the VoIP terminal of a communication partner from network delay time database 31 before starting communication, calculates the end-to-end delay time by adding this network delay time to the radio space delay time to radio LAN base station 701, and implements the power-save operation of radio communication module 25 at an activation period such that this end-to-end delay time is limited to the stipulated standard value or less.

Figure 10:
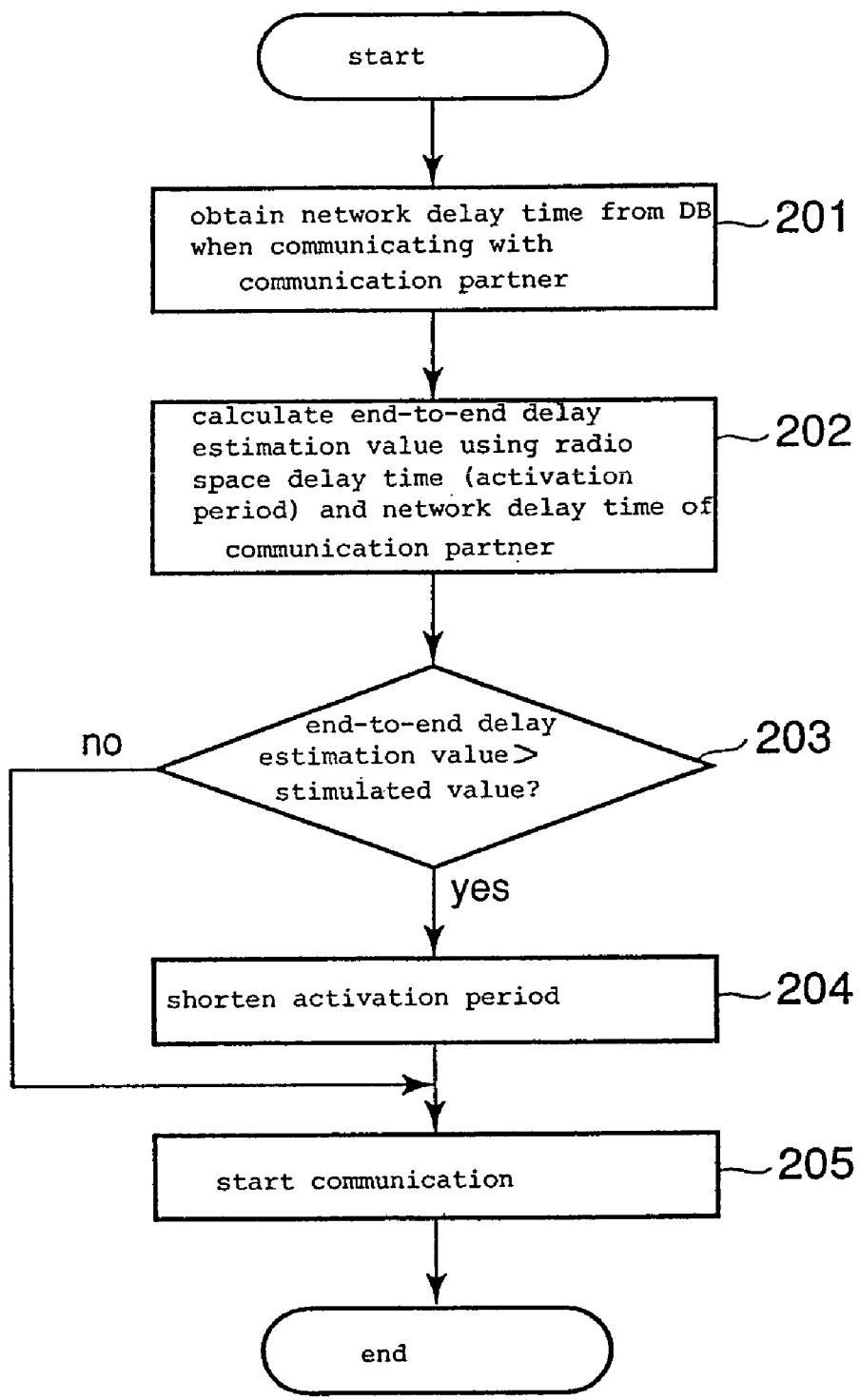
FIG. 10 is a flow chart showing the operation of radio VoIP terminal $20_C$ of the third embodiment of the present invention.

The operation of radio VoIP terminal $20_C$ in the present embodiment is next described with reference to FIG. 8 and FIG. 9 and the flow chart of FIG. 10.

Explanation is first presented regarding a case in which radio VoIP terminal $20_C$ initiates speech conversation by VoIP with VoIP terminal $30_D$.

First, in step 201, radio VoIP terminal $20_C$ obtains 100 ms, which is the predicted value of the network delay time when communicating with VoIP terminal $30_D$, from network delay time database (DB) 31 that is in radio VoIP terminal $20_C$.

Next, in step 202, activation period modification determination unit 37 of radio VoIP terminal $20_C$ calculates the end-to-end delay time with VoIP terminal $30_D$. The end-to-end delay time is the sum of the radio space delay time in radio VoIP terminal $20_C$ and the network delay time. Since the maximum radio space delay time of radio VoIP terminal $20_C$ is the same as the activation period, i.e., 200 ms, the maximum end-to-end delay time is 300 ms, which is obtained by adding 100 ms to this figure.

In step 203, activation period modification determination unit 37 next compares 300 ms, which is the maximum value of the obtained end-to-end delay time, with 400 ms, which is the stipulated value of the delay time for Class C.

In this case, the maximum value of the obtained end-to-end delay time is 300 ms, a delay time that is less than 400 ms and that thus satisfies the standard of Class C. As a result, activation period modification determination unit 37 does not modify the activation period of radio VoIP terminal $20_C$, and radio VoIP terminal $20_C$ therefore begins VoIP communication with VoIP terminal $30_D$ in step 205 while maintaining its activation period without change.

Explanation next regards the operation when radio VoIP terminal $20_C$ performs voice conversation by VoIP with VoIP terminal $30_E$.

In step 201, radio VoIP terminal $20_C$ first obtains 250 ms, which is the predicted value of the network delay time when communicating with VoIP terminal $30_E$, from network delay time database (DB) 31 that is included in radio VoIP terminal $20_C$.

Next, in step 202, activation period modification determination unit 37 of radio VoIP terminal $20_C$ calculates the end-to-end delay time with VoIP terminal $30_E$. The maximum radio space delay time of radio VoIP terminal $20_C$ is the same as the activation period, i.e., 200 ms, and the maximum end-to-end delay time is therefore obtained by adding this delay to 250 ms, which is the network delay time of VoIP terminal $30_E$, to obtain 450 ms.

Activation period modification determination unit 37 next compares the obtained maximum end-to-end delay time of 450 ms with 400 ms, which is the stipulated delay time value for Class C.

In this case, end-to-end delay time 450 ms is not equal to or less than 400 ms, which is the stipulated value for Class C; and activation period modification determination unit 37 therefore shortens the activation period to a one-beacon portion, i.e., 100 ms, in step 204 to limit the end-to-end delay time to within 400 ms, which is the standard for Class C. The radio space delay time therefore becomes a maximum of 100 ms and the end-to-end delay time becomes a maximum of 350 ms, thereby enabling VoIP communication that meets the standard of Class C.

According to radio VoIP terminal $20_C$ of the present embodiment, network delay time database 31 is provided for storing the network delay times of VoIP terminals $30_D$ and $30_E$ that are the communication partners, and activation period modification determination unit 37 calculates the end-to-end delay time before beginning communication by adding the network delay time of VoIP terminal of the communication partner to the radio space delay time to radio LAN base station 701, and then performing power-save operations of radio communication module 25 at an activation period such that this end-to-end delay time is limited to within the stipulated standard value. Accordingly, with each change of partner that is connected for communication, the optimum activation period that allows suppression of the end-to-end delay time to the stipulated standard value or less can be selected according to the network delay time of the VoIP terminal that is connected.

In other words, radio VoIP terminal $20_C$ of the present embodiment can meet restrictions on delay time when beginning the conversation and can guarantee conversation quality without entailing a large loss of battery drive time, even when realizing VoIP conversations with VoIP terminals having various network environments.

Although the present embodiment was described for a case in which the network delay times for all VoIP terminals $30_D$ and $30_E$ that can be connected as communication partners are stored in network delay time database 31, the present invention is not limited to this form, and when a radio terminal connects to a new VoIP terminal for which a network delay time has not been stored in network delay time database 31, the network delay time of this new VoIP terminal may be measured and then automatically added to network delay time database 31.

Further, although explanation was presented for a case in which network delay time database 31 is provided in radio VoIP terminal $20_C$ in the present embodiment, the present invention is not limited to this form. A construction is also possible in which the network delay times are stored in a database that corresponds to network delay time database 31 and that is provided in radio LAN base station 701. Adopting this construction allows a reduction of the volume of data that must be stored inside radio VoIP terminal $20_C$. In the case of this type of construction, when radio VoIP terminal $20_C$ begins communication in which the delay time of the VoIP communication is subject to limits, the network delay time of the VoIP terminal that is the communication partner is acquired from the database in radio LAN base station 701. Radio VoIP terminal $20_C$ can then modify the activation interval in the power-save mode based on this network delay time and limit the end-to-end delay time to the stipulated standard value or less.

A construction is also possible in which a database server that stores the network delay times from a radio base station to each VoIP terminal is provided on the network to which the radio terminals belong.

In addition, although not shown in the figures, the radio terminals of the first to third embodiments of the present invention are provided with a recording medium in which programs are recorded for executing the end-to-end delay time measurement method that is described hereinabove. Such a recording medium may be a magnetic disk, a semiconductor memory, or another type of recording medium. The programs are read to a radio terminal from the recording medium and then control the operations of the radio terminal. More specifically, the above-described processing is executed by having a CPU in the radio terminal, under the control of this program, instruct the hardware resources of the radio terminal to carry out specific processing.

While preferred embodiments of the present invention have been described using specific terms, such description is for illustrative purposes only, and it is to be understood that changes and variations may be made without departing from the spirit or scope of the following claims.

What is claimed is:

1. A radio terminal comprising:
   means for performing power-save operations by intermittently activating a radio communication module for performing radio communication with a radio base station;
   end-to-end delay acquisition means for periodically measuring the end-to-end delay time, which is the delay time required for end-to-end transmission and reception;
   activation period notification packet transceiving means for both transmitting an activation period notification packet for reporting its own activation period to the terminal of a communication partner and receiving activation period notification packets from the terminal of a communication partner; and
   activation period modification determination means for directing said activation period notification packet transceiving means to transmit an activation period notification packet to the terminal of a communication partner when the end-to-end delay time that has been measured by said end-to-end delay acquisition means is equal to or greater than a standard value that has been set in advance, comparing the activation period that has been reported from the terminal of a communication partner by means of an activation period notification packet with its own activation period, and performing a modification to shorten its own activation period when its own activation period is equal to or greater than the activation period of the terminal of the communication partner.

2. A radio terminal according to claim 1, wherein said end-to-end delay acquisition means measures said end-to-end delay time based on the time for a packet to make a round trip to and from the terminal of a communication partner.

3. A radio terminal according to claim 2, wherein said packet is a PING packet.

4. A radio terminal according to claim 2, wherein said packet is an RTCP packet.

5. A radio terminal comprising:
means for performing power-save operations by intermittently activating a radio communication module for performing radio communication with a radio base station;
a network delay time database for storing, for each fixed terminal that can be connected without the interposition of radio space, the network delay time from said radio base station to said fixed terminal; and
activation period modification determination means for:
acquiring the network delay time from said radio base station to a fixed terminal of a communication partner from said network delay time database before beginning communication with said fixed terminal;
periodically calculating the end-to-end delay time, which is the time required for end-to-end transmission and reception, by adding the network delay time and the radio space delay time to said radio base station; and modifying the activation period of said radio communication module such that the end-to-end delay time is limited to the stipulated standard value or less.

6. An end-to-end delay control method for limiting end-to-end delay time, which is the delay time required for end-to-end transmission and reception, to a stipulated standard value or less in a radio terminal that performs power-save operations by intermittently activating a radio communication module for performing radio communication with a radio base station, said method comprising steps of:
periodically measuring said end-to-end delay time;
transmitting to the terminal of a communication partner an activation period notification packet for reporting its own activation period to the terminal of the communication partner when said end-to-end delay time that has been measured is equal to or greater than a standard value that has been set in advance,
comparing its own activation period with the activation period that has been reported by an activation period notification packet from the terminal of a communication partner; and
carrying out modification to shorten its own activation period when its own activation period is equal to or greater than the activation period of the terminal of the communication partner.

7. An end-to-end delay control method according to claim 6, wherein, in said step of measuring said end-to-end delay time, said end-to-end delay time is measured based on the time for a packet to make a round trip to and from the terminal of a communication partner.

8. An end-to-end delay control method according to claim 7, wherein said packet is a PING packet.

9. An end-to-end delay control method according to claim 7, wherein said packet is an RTCP packet.

10. An end-to-end delay control method for limiting end-to-end delay time, which is the delay time required for end-to-end transmission and reception, to a stipulated standard value or less in a radio terminal that performs power-save operations by intermittently activating a radio communication module for performing radio communication with a radio base station, said method comprising steps of:
acquiring the network delay time from said radio base station to the fixed terminal of a communication partner from a network delay time database before starting communication with said fixed terminal;
periodically calculating the end-to-end delay time, which is the time required for end-to-end transmission and reception, by adding the network delay time to the radio space delay time to said radio base station; and
modifying the activation period of said radio communication module such that the end-to-end delay time is limited to a stipulated standard value or less.

* * * * *